(12) United States Patent
Forgang et al.

(10) Patent No.: US 7,902,827 B2
(45) Date of Patent: Mar. 8, 2011

(54) METHOD AND APPARATUS FOR COMBINED INDUCTION AND IMAGING WELL LOGGING

(75) Inventors: Stanislav W. Forgang, Houston, TX (US); Randy Gold, Houston, TX (US); Otto N. Fanini, Houston, TX (US); Michael S. Crosskno, Spring, TX (US); Tammye Crosskno, legal representative, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 147 days.

(21) Appl. No.: 11/855,329

(22) Filed: Sep. 14, 2007

(65) Prior Publication Data
US 2008/0088313 A1 Apr. 17, 2008

Related U.S. Application Data

(60) Provisional application No. 60/845,795, filed on Sep. 19, 2006.

(51) Int. Cl.
*G01V 3/10* (2006.01)
(52) U.S. Cl. .................... 324/339; 324/338; 702/11
(58) Field of Classification Search .................. 324/356, 324/369; 175/40, 50; 166/250.01; 702/7
See application file for complete search history.

(56) References Cited

U.S. PATENT DOCUMENTS

| 4,837,517 | A | 6/1989 | Barber | 324/339 |
|---|---|---|---|---|
| 5,157,605 | A | 10/1992 | Chandler et al. | 324/422 |
| 5,600,246 | A | 2/1997 | Forgang et al. | 324/339 |
| 6,573,722 | B2 | 6/2003 | Rosthal et al. | 324/338 |
| 6,586,939 | B1 | 7/2003 | Fanini et al. | 324/339 |
| 6,600,321 | B2 | 7/2003 | Evans | |
| 6,624,634 | B2 | 9/2003 | Rosthal et al. | 324/338 |
| 6,677,756 | B2 | 1/2004 | Fanini et al. | |
| 2005/0256644 | A1* | 11/2005 | Xiao | 702/7 |

FOREIGN PATENT DOCUMENTS
EP 0777135 6/1997

OTHER PUBLICATIONS

Barber et al.; "Determining Formation Resistivity Anisotropy in the Presence of Invasion", SPE 90526, SPE Annual Technical Conference and Exhibition, Houston, Texas, Sep. 26-29, 2004, pp. 1-25.
Rosthal et al.; "Field Test Results of an Experimental Fully-Triaxial Induction Tool", SPWLA 44th Annual Logging Symposium, Paper QQ, Jun. 22-25, 2003, 2003, pp. 1-13.
Moran et al.; *Basic Theory of Induction Logging and Application to Study of Two-Coil Sondes*, Geophysics, vol. XXVII, No. 6, Part I (Dec. 1962), pp. 829-858.

* cited by examiner

*Primary Examiner* — Reena Aurora
(74) *Attorney, Agent, or Firm* — Mossman Kumar & Tyler PC

(57) ABSTRACT

An induction logging device is provided with additional electrodes. One set of electrodes provides voltages that are indicative of the current distribution in the borehole. The output of the first set of electrodes may be used for estimating formation resistivity. A second set of electrodes may be used to provide an image of the formation.

23 Claims, 8 Drawing Sheets

METHOD AND APPARATUS FOR COMBINED INDUCTION AND IMAGING WELL LOGGING

CROSS-REFERENCES TO RELATED APPLICATIONS

This application claims priority from U.S. Provisional Patent Application Ser. No. 60/845,795 filed on 19 Sep. 2006.

BACKGROUND OF THE DISCLOSURE

1. Field of the Disclosure

The disclosed disclosure is related to downhole well investigation methods and, in particular, to studying a resistivity distribution of a formation surrounding a borehole.

2. Description of the Related Art

Electromagnetic induction resistivity well logging instruments are well known in the art. Electromagnetic induction resistivity well logging instruments are used to determine the electrical conductivity, and its converse, resistivity, of earth formations penetrated by a borehole. Formation conductivity has been determined based on results of measuring the magnetic field of eddy currents that the instrument induces in the formation adjoining the borehole. The electrical conductivity is used for, among other things, inferring the fluid content of the earth formations. Typically, lower conductivity (higher resistivity) is associated with hydrocarbon-bearing earth formations. The physical principles of electromagnetic induction well logging are well described, for example, in, J. H. Moran and K. S. Kunz, *Basic Theory of Induction Logging and Application to Study of Two-Coil Sondes*, Geophysics, vol. 27, No. 6, part 1, pp. 829-858, Society of Exploration Geophysicists, December 1962. Many improvements and modifications to electromagnetic induction resistivity instruments described in the Moran and Kunz reference, supra, have been devised, some of which are described, for example, in U.S. Pat. No. 4,837,517 issued to Barber, in U.S. Pat. No. 5,157,605 issued to Chandler et al and in U.S. Pat. No. 5,600,246 issued to Fanini et al.

The conventional geophysical induction resistivity well logging tool is a probe suitable for lowering into the borehole and comprises a sensor section containing a transmitter and receiver and other, primarily electrical, equipment for measuring data to infer the physical parameters that characterize the formation. The sensor section, or mandrel, comprises induction transmitters and receivers positioned along the instrument axis, arranged in the order according to particular instrument or tool specifications. The electrical equipment generates an electrical voltage to be further applied to a transmitter induction coil, conditions signals coming from receiver induction coils, processes the acquired information, and stores or by means of telemetry sends the data to the earth surface through a wire line cable used to lower the tool into the borehole.

Conventional induction well logging techniques employ coils wound on an insulating mandrel. One or more transmitter coils are energized by an alternating current. The oscillating magnetic field produced by this arrangement induces currents in the formations which are nearly proportional to the conductivity of the formations. These currents, in turn, contribute to a voltage induced in one or more receiver coils. By selecting only the voltage component which is in phase with the transmitter current, a signal can be obtained that is approximately proportional to the formation conductivity. In a conventional induction logging apparatus, the basic transmitter coil and receiver coil have axes which are aligned with the longitudinal axis of the well logging device. (For simplicity of explanation, it will be assumed that the borehole axis is aligned with the axis of the logging device, and that this axis defines a vertical direction. Thus, transmitter and receiver coils aligned with the longitudinal axis are "vertically-oriented.") This arrangement tends to induce secondary current loops in the formations that are concentric with the vertically-oriented transmitting and receiving coils. The resultant conductivity measurements are indicative of the conductivity (or resistivity) of the surrounding formations. Some formations may display anisotropic conductivity profiles, such that the conductivity measured in a vertical direction is different than the conductivity measured in a horizontal direction. This anisotropic conductivity can be detected by using additional coils oriented along axes different from the vertical axis.

A multi-component induction logging apparatus allows for obtaining data related to both vertical and horizontal resistivities and are known in the industry. Typically, such an apparatus contains a set of induction coils oriented in certain directions distributed along the sensor (the mandrel) in a special arrangements or arrays. A typical arrangement has three transmitter coils, with one vertically-oriented and two transversely-oriented (oriented in the plane perpendicular to the longitudinal axis). Typically, these coils define an orthogonal system and may produce magnetic fields substantially oriented along x-, y-, and z-axes, where the z-axis often refers to the vertical axis. The vertically-oriented array radiates a field primarily along the longitudinal direction and measures the formation response in the direction coaxial with the longitudinal axis of the tool. Generally, in a vertical borehole, this array obtains measurements regarding the horizontal resistivity of the formation. Alternately, a radially-oriented (transverse) array radiates a field oriented primarily in the radial direction and generally obtains measurements regarding the vertical resistivity of the formation.

It is known that due to specifics of the well logging instruments design, the mandrel often serves as a load bearing element. The mandrel maintains the tool integrity, carries the load introduced by tools attached below the induction instrument, withstands a significant torque, etc. All the above-mentioned requirements necessitate using a significant number of metal components in the mandrel. These metal components provide a conductive path though the sensor for electrical instruments separated at locations above and below the tool. The presence of metal bodies in the sensor section leads to unwanted axial currents in these metal parts and to the appearance of systematic errors in the instrument response. These systematic errors are often called an "offset." Methods for addressing these offsets are discussed, for example, in U.S. Pat. No. 6,586,939 to Fanini et al., having the same assignee as the present disclosure. Although the offset problem is severe for radial arrays, it is almost insignificant for vertical arrays.

Another measurement issue encountered in induction logging is called a "borehole effect" and affects the performance of induction tools through an induced current flow that is proximate to the mandrel surface. These currents are magnetically induced or created by a potential difference between upper and lower tool electronic parts due to these parts being exposed to conductive mud. The magnetic fields generated by the induced current often mask useful responses from the formation. The borehole effect can be suppressed by reducing these induced currents. Also, special software post-processing, such as multi-frequency focusing (MFF) can be used to account for the borehole effect. U.S. Pat. Nos. 6,573,722 and 6,624,634, to Rosthal et al., discuss methods for reducing the borehole effect and include, among others, providing a counter-current to the induced current, providing an alternate path for the induced current, and using a superposition technique.

Induction tools, including HDIL (High Definition Induction Logging) which employs multiple vertically-oriented receivers and array-induction logging (AIL) having transmitters and receiver oriented in multiple directions, have been known to encounter the borehole effect in the presence of conductive mud. If the induced current flows entirely in the conductive mud, the effects tend to cancel out. However, where a significant portion of the induced current passes through the formation and the mud is much more conductive than the formation, then this borehole effect can become significant. Generally, the borehole effect occurs in a mandrel decentralized in the borehole such that a standoff presents itself between the mandrel and formation.

Multi-frequency focusing (MFF) is an efficient way of increasing depth of investigation for electromagnetic logging tools. MFF techniques suppress significant portion of the measured signal. Therefore, reducing the borehole effect is important in MFF testing as well as traditional axial tool testing.

The induced current can exhibit a non-uniform current density distribution on the metal surface of the mandrel. Thus, to obtain a corrected measurement typically requires a significant amount of auxiliary data (tool position, borehole shape, invasion profile, etc.). Determining the correct measurement is desired for subsequent calculations, such as heavy 3D modeling of expected tool response and inversion.

The problem of borehole effect can be minimized if this induced current distribution is known or measured. Thus, there is a need to account for the effects of induced currents from a metal mandrel measurements obtained in a borehole with conductive mud. The present disclosure addresses this need.

SUMMARY OF THE DISCLOSURE

One embodiment of the disclosure is an apparatus for evaluating an earth formation. The apparatus includes a mandrel conveyed in a borehole in the earth formation. A transmitter antenna is disposed on the mandrel, activation of the transmitter antenna producing an electromagnetic field in a region surrounding the antenna. A receiver antenna produces an output responsive to a first current generated by the electromagnetic field in the formation and to a second current generated by the electromagnetic fielding the borehole. A plurality of electrodes on the mandrel have voltages indicative of a distribution of the second current. The mandrel may include an upper section and a lower section with the transmitter antenna disposed between the upper section and the lower section. The transmitter antenna may have an axis oriented at a non-zero angle to a longitudinal axis of the borehole. The electrodes may include a first set of electrodes on the upper section and a second set of electrodes on the lower section. There may be a third set of electrodes on the upper section and a fourth set of electrodes on the lower section, the third and fourth sets of electrodes separated from the first and second sets of electrodes. The apparatus may include a device which measures a standoff of the mandrel from a wall of the borehole. The apparatus may further include a processor which uses the standoff measurements, the voltages of the plurality of electrodes and the output of the receiver antenna for estimating a resistivity parameter of the earth formation. The processor may estimate the resistivity parameter using a model based on the voltages of the plurality of electrodes. The apparatus may further include a processor configured to use an output of the third and fourth sets of electrodes to produce an image of the earth formation. The apparatus may include a conveyance device which conveys the mandrel into the borehole. The conveyance device may be a wireline, a drilling tubular or a slickline.

Another embodiment of the disclosure is a method of evaluating an earth formation. The method includes activating a transmitter antenna on a mandrel conveyed in a borehole in the earth formation and producing an electromagnetic field in a region surrounding the antenna. The method further includes using a receiver antenna and producing an output responsive to a first current generated by the electromagnetic field in the formation and to a second current generated by the electromagnetic field in the borehole. The method further includes using a plurality of electrodes on the mandrel to provide a voltage indicative of a distribution of the second current. The antenna may be positioned between an upper section of the mandrel and a lower section of the mandrel. The method may further include orienting the transmitter antenna at a non-zero angle to a longitudinal axis of the borehole.

Another embodiment of the disclosure is a computer readable medium for use with an apparatus for evaluating an earth formation. The apparatus includes a mandrel conveyed in a borehole in the earth formation, a transmitter antenna on the mandrel which produces an electromagnetic field in a region surrounding the borehole, a receiver antenna which produces an output responsive to a first current generated by the electromagnetic field in the earth formation and second current generated by the electromagnetic field in the borehole; and a plurality of electrodes which have voltages indicative of a distribution of the second current. The medium includes instructions which enable a processor to use the voltage of the plurality of electrodes and the output of the receiver antenna for estimating a resistivity parameter of the earth formation. The machine-readable medium may include a ROM, an EPROM, an EAROM, a flash memory, and an optical disk.

BRIEF DESCRIPTION OF THE DRAWINGS

For detailed understanding of the present disclosure, references should be made to the following detailed description of an exemplary embodiment, taken in conjunction with the accompanying drawings, in which like elements have been given like numerals, wherein.

DETAILED DESCRIPTION OF THE DISCLOSURE

Figure 1:
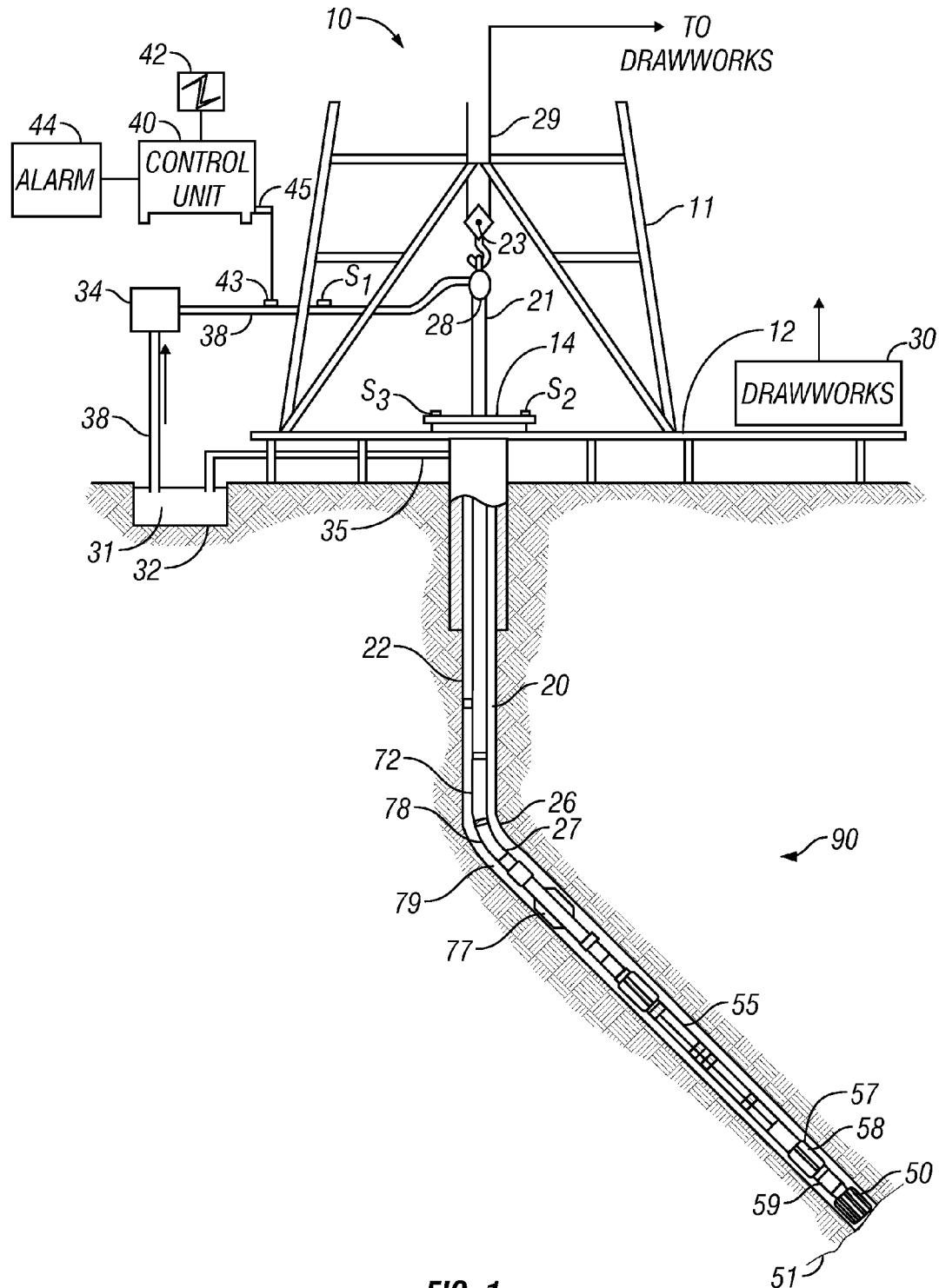
FIG. 1 (prior art) shows a schematic diagram of a drilling system with a drillstring carrying a drilling assembly conveyed in a borehole for drilling and measuring the wellbore.

The apparatus and method of the present disclosure is discussed with reference to a measurement-while-drilling implementation in which the logging tool is conveyed on a drilling tubular. This is not to be construed as a limitation: the present disclosure may also be used in wireline implementations. FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 38 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ typically placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the disclosure, the drill bit 50 is rotated by only rotating the drill pipe 22. In another embodiment of the disclosure, a downhole motor 55 (mud motor) is disposed in the drilling assembly 90 to rotate the drill bit 50 and the drill pipe 22 is rotated usually to supplement the rotational power, if required, and to effect changes in the drilling direction.

In an exemplary embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the disclosure, a drilling sensor module 59 is placed near the drill bit 50. The drilling sensor module contains sensors, circuitry and processing software and algorithms relating to the dynamic drilling parameters. Such parameters typically include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices via a sensor 43 placed in the fluid line 38 and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 typically includes a computer or a microprocessor-based processing system, memory for storing programs or models and data, a recorder for recording data, and other peripherals. The control unit 40 is typically adapted to activate alarms 44 when certain unsafe or undesirable operating conditions occur.

Figure 2:
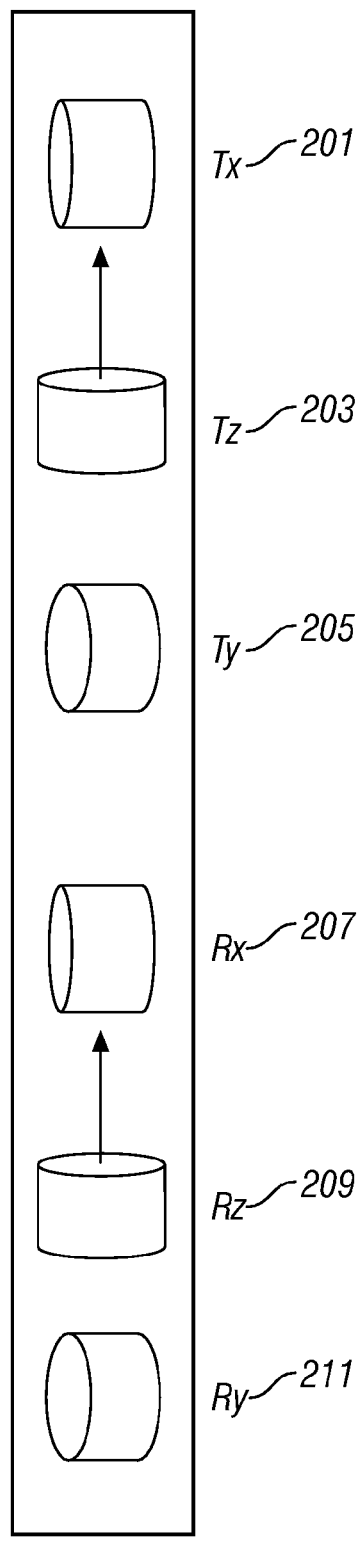
FIG. 2 (prior art) shows the configuration of transmitter and receiver coils in the 3DExplorer™ (3DEX™) induction logging instrument of Baker Hughes.

FIG. 2 (prior art) shows the configuration of transmitter and receiver coils in the 3DExplorer™ (3DEX™) induction logging instrument of Baker Hughes. Three orthogonal transmitters 201, 203, and 205 that are referred to as the $T_x$, $T_z$, and $T_y$ transmitters are placed in the order shown. The three transmitters induce magnetic fields in three spatial directions. The subscripts (x, y, z) indicate an orthogonal system substantially defined by the directions of the normal to the coils of the transmitters. The z-axis is chosen to be along the longitudinal axis of the tool, while the x-axis and y-axis are mutually perpendicular directions lying in the plane transverse to the axis. Corresponding to each transmitter 201, 203, and 205 are associated receivers 207, 209, and 211, referred to as the $R_x$, $R_z$, and $R_y$ receivers, aligned along the orthogonal system defined by the transmitter normals, placed in the order shown. $R_x$, $R_z$, and $R_y$ are responsible for measuring the corresponding magnetic fields $H_{xx}$, $H_{zz}$, and $H_{yy}$. Within this system for naming the magnetic fields, the first index indicates the direction of the transmitter and the second index indicates the direction of the receiver. Thus $H_{xx}$, for example, indicates the field response due to a field generated by the $T_x$ transmitter and recorded at the $R_x$ receiver. In addition, the receivers $R_y$ and $R_z$ can measure two cross-components, $H_{xy}$ and $H_{xz}$, of the magnetic field produced by the $T_x$ transmitter (201). This embodiment of the disclosure is operable in single frequency or multiple frequency modes. It should further be noted that the description herein with the orthogonal coils and one of the axes parallel to the tool axis is for illustrative purposes only. Additional components could be measured, and, in particular, the coils could be inclined at an angle other than 0° or 90° to the tool axis, and furthermore, need not be orthogonal; as long as the measurements can be "rotated" or "projected" onto three orthogonal axes, the methodology of the apparatus is applicable. Measurements may also be made at a plurality of frequencies, and/or at a plurality of transmitter-receiver distances.

Figure 3:
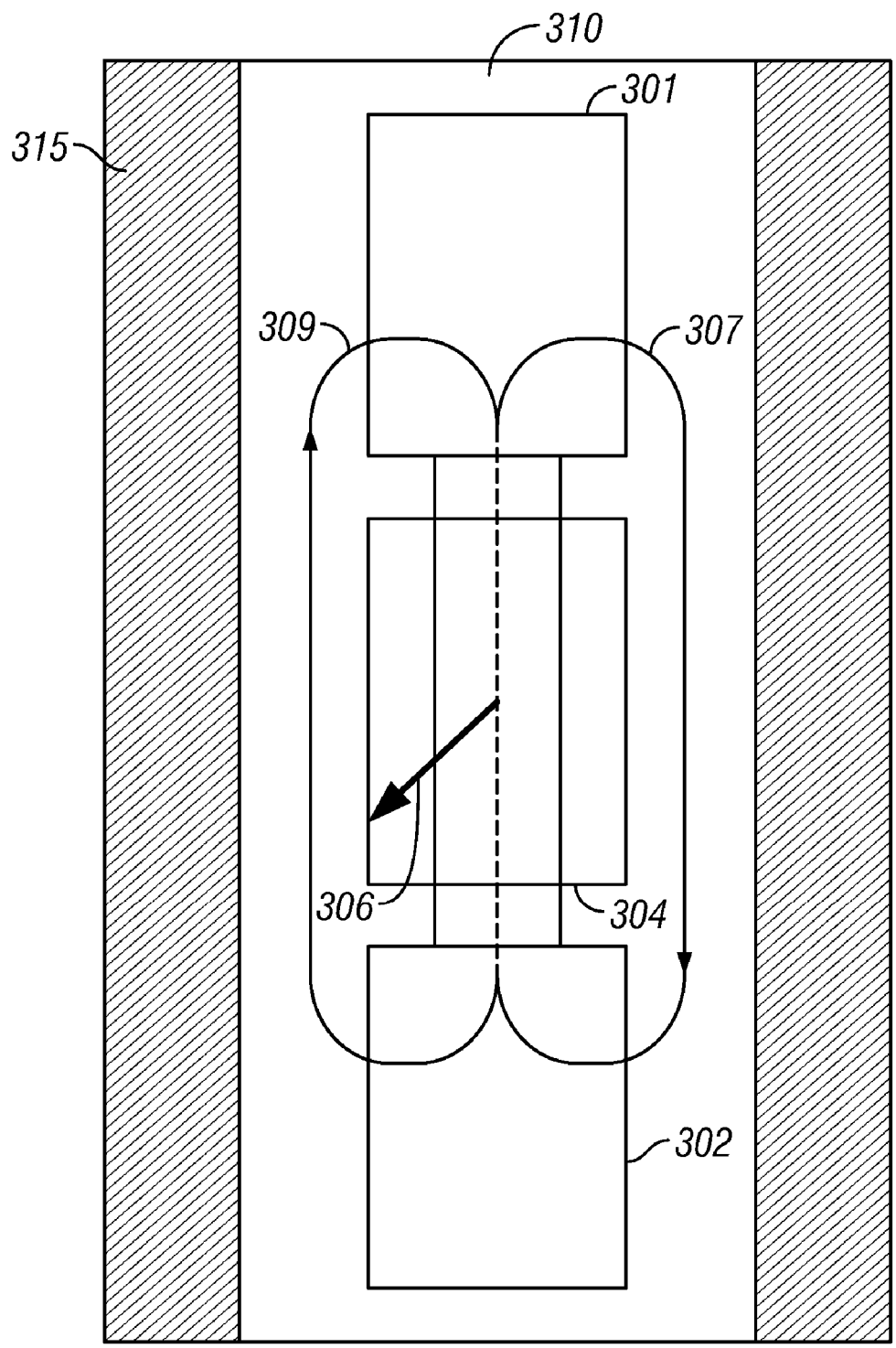
FIG. 3 shows an exemplary radial transmitter assembly located on a mandrel centered within a borehole.

FIG. 3 shows an exemplary radial transmitter assembly on a mandrel centered within a borehole. Radial transmitter 304 is disposed between an upper mandrel portion 301 and a lower mandrel portion 302. The upper and lower mandrel portions are exposed to conductive drilling mud 310. The radial transmitter 304 comprises an antenna (conductive loop) having a normal 306 oriented substantially perpendicular to the longitudinal axis of the mandrel. The conductive loop is connected to electrical equipment (not shown). The radial transmitter is activated when the electrical equipment generates a current, typically an alternating current, through the loop. The current generated in radial transmitter 304 creates a magnetic field in the surrounding region. When the magnetic field penetrates the formation 315, the formation generates an induced magnetic field of its own which is representative of the properties of the formation. This induced magnetic field is then recorded. In addition to the formation response, an induced current is generated which may give rise to the above-mentioned borehole effect. In the example of FIG. 3, the induced current comprises an induced current 307 flowing from upper mandrel portion 301 to lower mandrel portion 302 and induced current 309 flowing from lower mandrel portion 302 to upper mandrel portion 301. The currents 307 and 309 combine to give rise to a circulating current. This current is shown circulating in a clockwise direction for illustrative purposes only. The circulating current may be either magnetically induced or created by a potential difference between the upper and lower mandrel portions being exposed to mud 310. FIG. 3 shows an optimal case in which the tool is centralized within the borehole. In the illustration of FIG. 3, the induced currents 307 and 309 flow entirely through the mud 310 without any current path traversing the formation 315. Hence, the magnitudes of currents 307 and 309 are approximately equal, and the net induced current thus is substantially zero.

Figure 4:
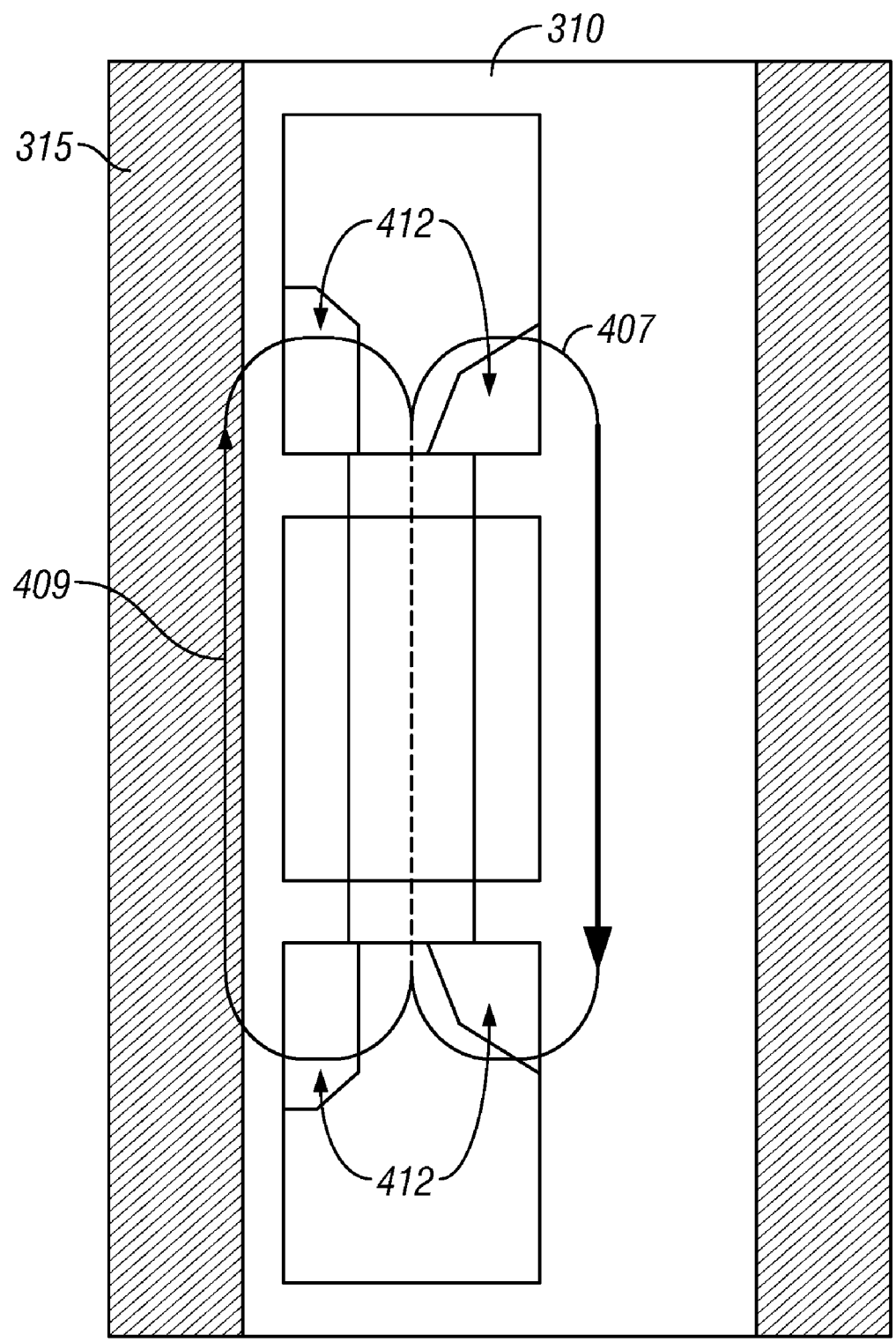
FIG. 4 shows an exemplary induced current flow affected by a current path through a formation.

FIG. 4 shows an exemplary induced current flow affected by a current path through a formation. The exemplary mandrel of FIG. 4 is decentralized in the borehole. Due to the proximity of the mandrel to a borehole face, upward-flowing current 409 travels at least in part through formation 315 while downward-flowing current 407 travels within the mud 310. For a conductive mud and resistive formation, the magnitude of the downward-flowing current is greater than the magnitude of the upward-flowing current. Thus, there is a net current flow established from the upper mandrel portion to the lower mandrel portion. As shown in FIG. 4, the induced current returns to the mandrel at areas 412 that are generally located just above and below the transmitter coils along the perimeter of the mandrel. The current density on the mandrel in the area of return is generally not symmetrical.

To recover the correct results about formation property in the presence of the induced current, a significant amount of auxiliary data (tool position, borehole shape, invasion profile, etc.) may be useful for further 3D modeling of expected tool response and obtaining a reliable inversion. The modeling problem becomes less severe if this mandrel current distribution were known or measured. This is discussed next.

Figure 5:
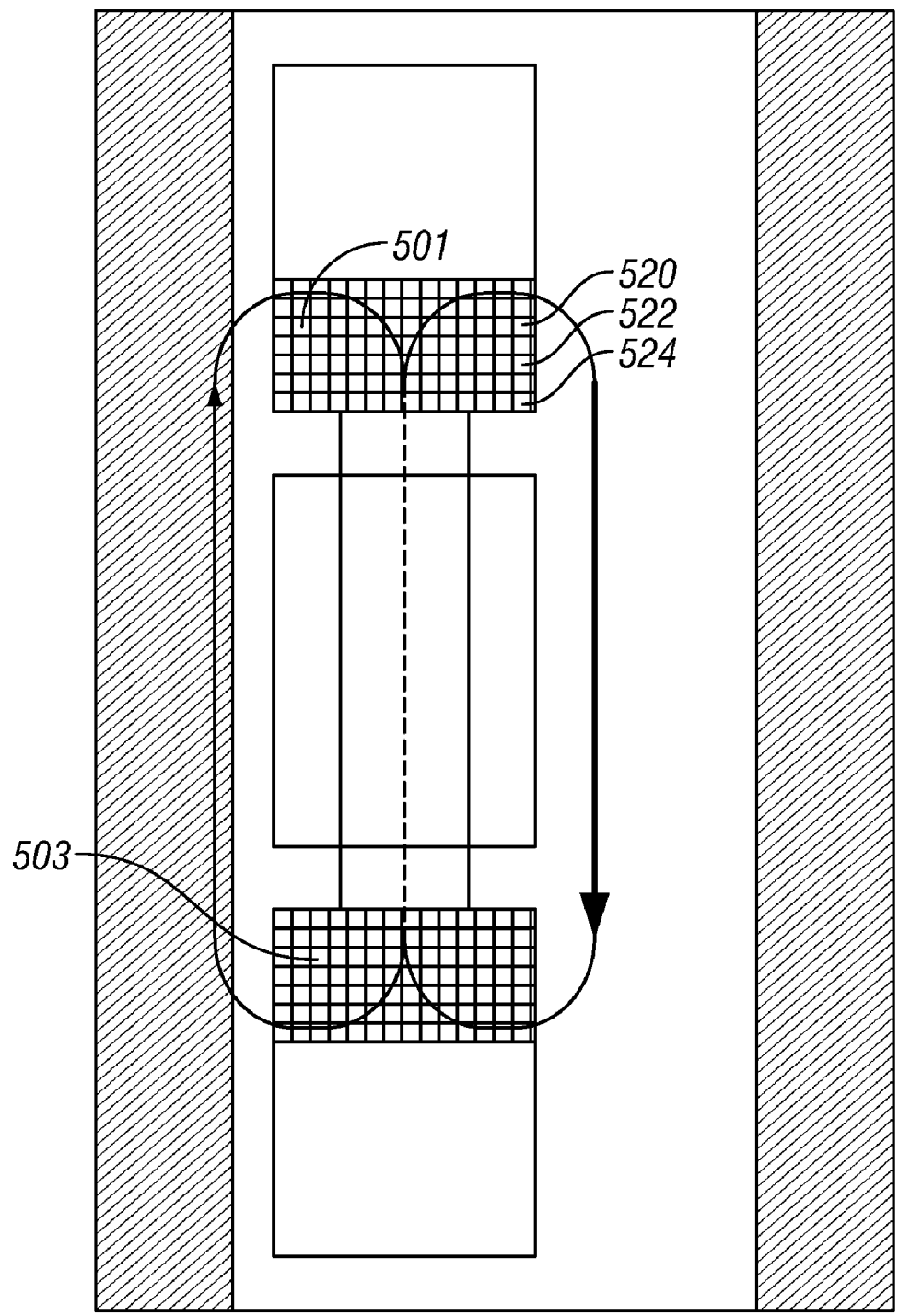
FIG. 5 shows a mandrel having upper and lower bands of measuring buttons for obtaining measurements of the induced current.

FIG. 5 shows an embodiment of the present disclosure with a mandrel having upper and lower bands of measuring buttons (electrodes). These buttons are used for obtaining measurements related to the induced current. An upper measuring band 501 surrounds the upper mandrel along its perimeter just above the radial transmitter coil. A lower measuring band 503 surrounds the lower mandrel along its perimeter just below the radial transmitter coil. Each band comprises a set of measurement buttons, such as exemplary buttons 520, 522, 524, for performing an electrical measurement. Thus the buttons are located at the current return area of the mandrel current (e.g., areas 412 in FIG. 4). Each of these current measuring buttons is electrically separated from the metal mandrel through an impedance device so as to minimally affect the magnitude of the induced current. In one aspect, this impedance device may be a small resistor. The voltage drop across each of these buttons may be measured by means of signal conditioning and processing electronics. Measuring the voltage drop enables building a profile of mandrel current distribution. This acquired data may be used as an additional input for subsequent calculations, such as tool response modeling and inversion.

Figure 6:
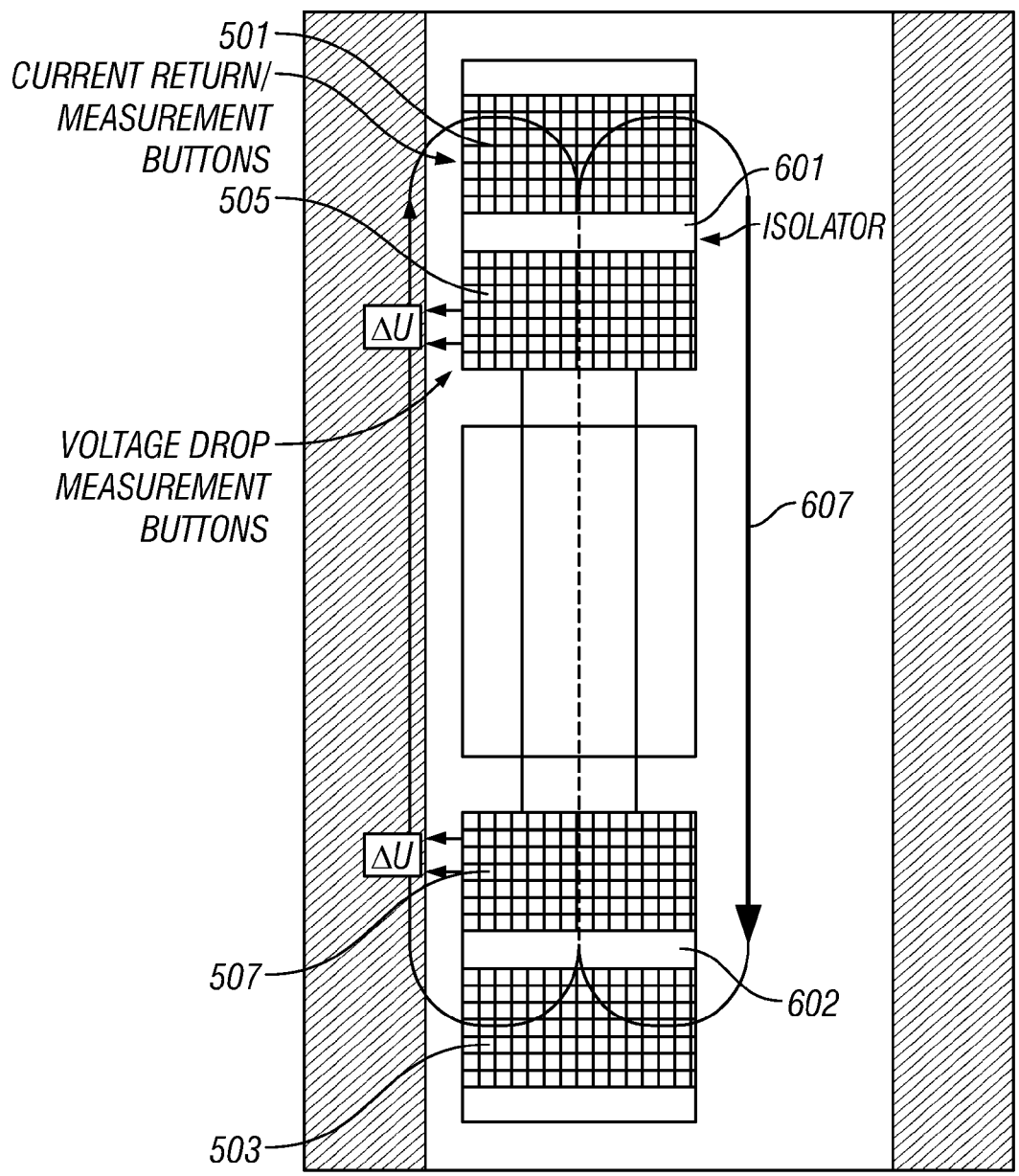
FIG. 6 shows multiple buttons bands distributed along the mandrel surrounding a radial transmitter coil for obtaining current return and voltage drop measurements related to the induced current.

In another embodiment of the disclosure, additional button bands distributed along the mandrel the instrument are used to enable shallow conductivity imaging during MWD operations where standoff is small compared to wireline applications. FIG. 6 shows multiple buttons bands distributed along the mandrel surrounding a radial transmitter coil for obtaining current return and voltage drop measurements related to the induced current. The set of button bands comprises a first upper measuring band 501 surrounding the upper mandrel along its perimeter above the radial transmitter coil and a second upper measuring band 505 between the transmitter coil and the first upper band 501. The second upper band 505 is separated from the first upper measuring band by an isolator 601.

The lower set of button bands comprises a first lower measuring band 503 surrounding the lower mandrel along its perimeter below the radial transmitter coil and a second lower measuring band 507 between the transmitter coil and the first lower measuring band 503. The second lower measuring band is separated from the first lower measuring band by an isolator 602. In one aspect, the outer bands located above 501 and below 503 the radial induction coil may be filled with current return buttons for measuring a current, such as borehole current 607, and the inner bands 505 and 507 may be made with high input impedance buttons to enable measuring a potential difference of the upper and lower mandrel portions. The additional button bands distributed along the mandrel additionally enable shallow conductivity imaging that may provide practical advantages primarily in measurement-while-drilling (MWD) applications in which standoffs are negligible.

Those versed in the art and having benefit of the present disclosure would recognize that in wells with conductive borehole fluid where the mud conductivity is greater than the formation conductivity, the bands 505 and 507 would provide little information about the formation image because the potential difference in the borehole wall would be overshadowed by the mud. The data from 505 and 507 would be useful in identifying tool eccentricity and may be used in further processing. On the other hand, in wells with non-conductive mud, the bands 505 and 507 would provide a reliable formation image.

Figure 7:
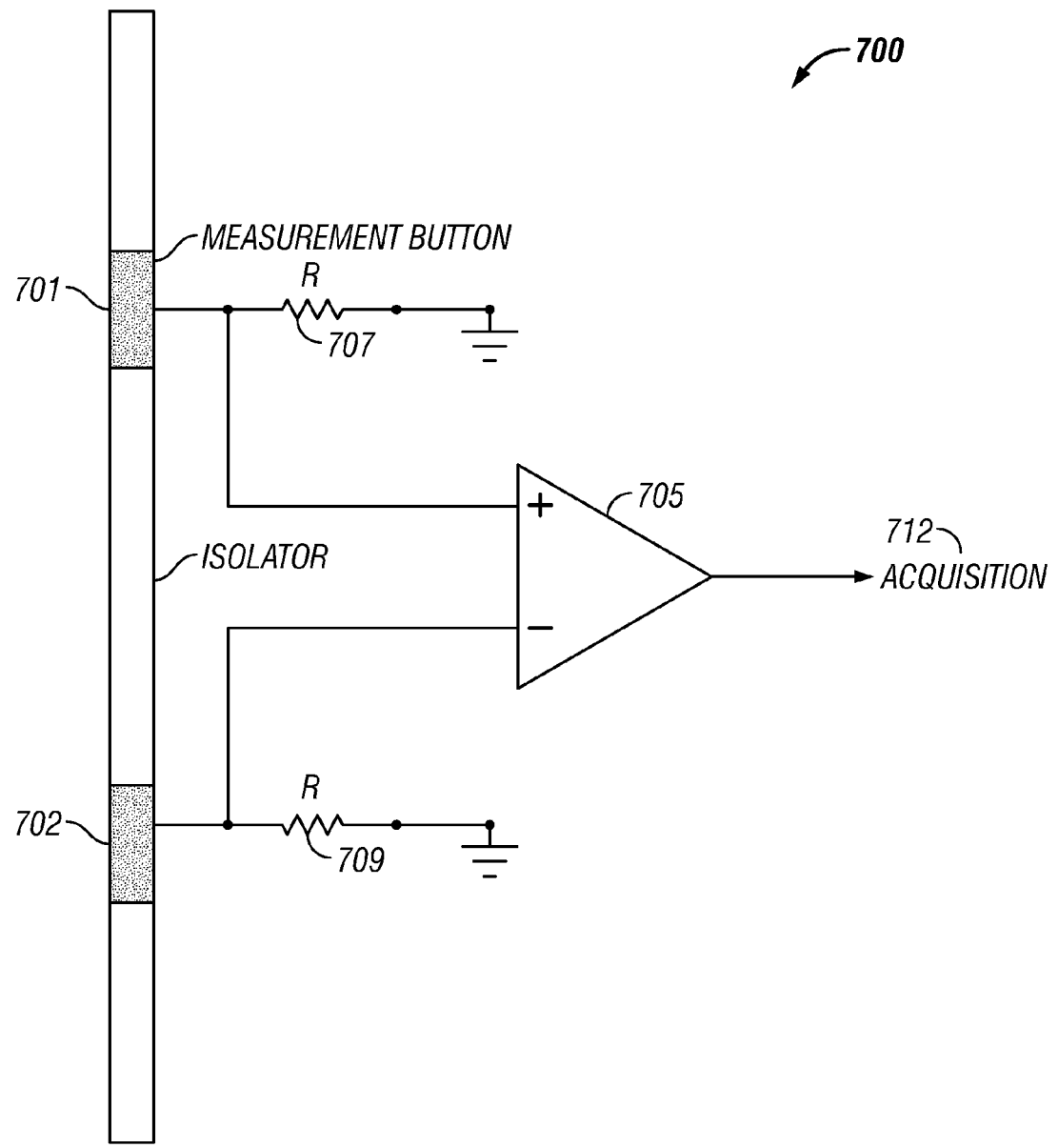
FIG. 7 shows an exemplary circuitry for obtaining measurements related to the induced current.

FIG. 7 shows an exemplary circuitry 700 for obtaining measurements related to the induced current. The circuitry comprises an operational amplifier 705 to which measurement buttons 701 and 702, which may be voltage measurement buttons or current measurement buttons, are electrically connected and provide input. Resistors 707 and 709 prevent measurement buttons 701 and 702 respectively from conducting to ground. In one aspect, the operational amplifier 705 may be used as high-input impedance differential amplifier. To provide for high input impedance of inner button every two (or more) buttons in a band may be connected to the differential amplifier. In another aspect, the output 709 of the operational amplifier 705 may be used, for example to measure an electrical property, such as potential difference, to be used in subsequent processing and calculations 712. The circuitry of FIG. 7 is useful with the electrodes of the bands 501 and 503. The electrodes of bands 505, 507 have high impedance to begin with, and hence the circuitry of FIG. 7 could be used without the resistors.

Figure 8:
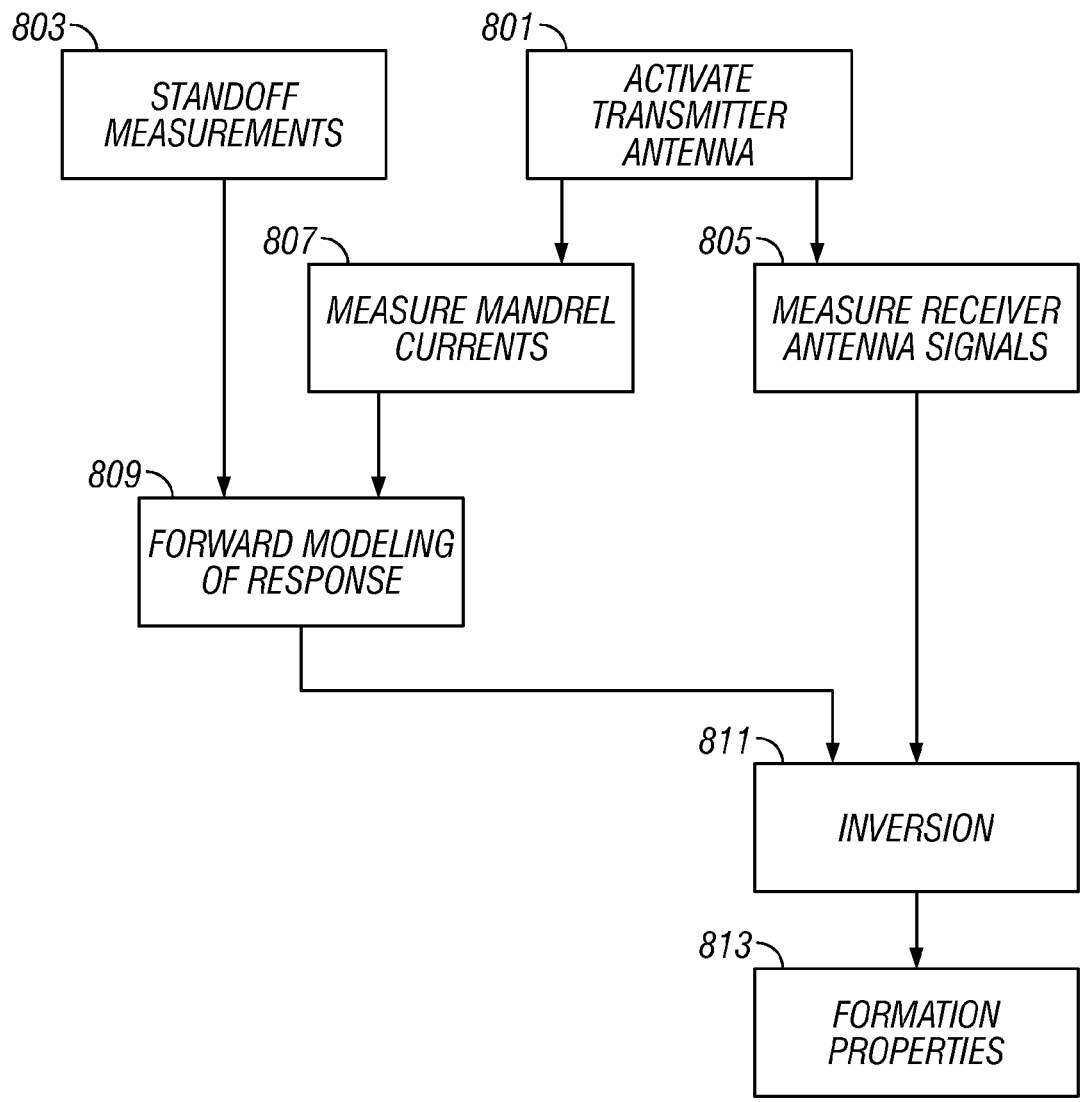
FIG. 8 is a flow chart illustrating some steps of an embodiment of the present disclosure.

Using the apparatus and method of the present disclosure, it is thus possible to obtain a measurement of the flow of currents in the mandrel (and the borehole). The measured currents may be output to a suitable device such as a display device or to a memory device and used for further processing. The current can then be used to model a forward response and then invert induction measurements to obtain parameters of the earth formation such as vertical and horizontal resistivity (or conductivity), layer thickness etc. This is shown schematically in FIG. 8.

A transmitter coil is activated 801. This may be a transverse coil or could also be a vertical coil oriented along the z-axis. Concurrently with the activation of the transmitter coil, standoff measurements may be made 803. For wireline applications, an acoustic or mechanical caliper may be used. For MWD applications, the standoff may be inferred from the relative positions of stabilizer blades. Using the apparatus described above, the mandrel currents are measured 807. Using the mandrel currents and the standoff, forward modeling of currents in the earth formation may be made 809. The forward model is then used to invert 811 received signals 805 in a transverse or vertical receiver antenna. The received signals are responsive to currents induced in the formation and in the borehole by the activation of the transmitter antenna. The results of the inversion include vertical and horizontal formation resistivities and may be further used to interpret petrophysical parameters such as those described in U.S. Pat. No. 6,470,274 to Mollison et al., U.S. Pat. No. 6,493,632 to Mollison et al., U.S. Pat. No. 6,711,502 to Mollison et al., U.S. Pat. No. 6,686,736 to Schoen et al., having the same assignee as the present disclosure and the contents of which are incorporated herein by reference. The results of the inversion described here may be output to a suitable device such as a display device or a memory device for further processing. Similarly, the results of the petrophysical interpretation may also be output to a suitable device such as a display device or a memory device for further processing.

The operation of the transmitter and receivers may be controlled by the downhole processor and/or the surface processor. Implicit in the control and processing of the data is the use of a computer program implemented on a suitable machine readable medium that enables the processor to perform the control and processing. The machine readable medium may include ROMs, EPROMs, EAROMs, Flash Memories and Optical disks.

While the foregoing disclosure is directed to the preferred embodiments of the disclosure, various modifications will be apparent to those skilled in the art. It is intended that all variations within the scope and spirit of the appended claims be embraced by the foregoing disclosure.

What is claimed is:

1. An apparatus for evaluating an earth formation, the apparatus comprising:
   a mandrel configured to be conveyed in a borehole in the earth formation;
   a transmitter antenna on the mandrel configured to produce an electromagnetic field in a region surrounding the antenna;
   a receiver antenna configured to produce an output responsive to a first current generated by the electromagnetic field in the formation and to a second current generated by the electromagnetic field in the borehole; and
   a plurality of electrodes on the mandrel configured to have voltages indicative of a distribution of the second current.

2. The apparatus of claim 1 wherein the mandrel comprises an upper section and a lower section, and wherein the transmitter antenna is disposed between the upper section and the lower section.

3. The apparatus of claim 2 wherein the plurality of electrodes comprises a first set of electrodes on the upper section and a second set of electrodes on the lower section.

4. The apparatus of claim 3 wherein the plurality of electrodes further comprises a third set of electrodes on the upper section and a fourth set of electrodes on the lower section, the third and fourth sets of electrodes separated from the first and second sets of electrodes respectively.

5. The apparatus of claim 4 further comprising a processor configured to use an output of the third and fourth sets of electrodes responsive to the first current for producing an image of the earth formation.

6. The apparatus of claim 1 wherein the transmitter antenna has an axis oriented at a non-zero angle to a longitudinal axis of the borehole.

7. The apparatus of claim 1 further comprising a device which configured to measure a standoff of the mandrel from a wall of the borehole.

8. The apparatus of claim 7 further comprising a processor configured to use the standoff measurement, the voltages of the plurality of electrodes and the output of the receiver antenna to estimate a resistivity parameter of the earth formation.

9. The apparatus of claim 8 wherein the processor is configured to estimate the resistivity parameter by using a model based at least in part on the voltages of the plurality of electrodes.

10. The apparatus of claim 1 further comprising a conveyance device configured to convey the mandrel into the borehole, wherein the conveyance device is selected from (i) a wireline, (ii) a drilling tubular, and (iii) a slickline.

11. The method of claim 1 further comprising conveying the mandrel into the borehole using a device selected from: (i) a wireline, (ii) a drilling tubular, and (iii) a slickline.

12. The apparatus of claim 1, wherein the mandrel is conducting.

13. A method of evaluating an earth formation, the method comprising:
   activating a transmitter antenna on a mandrel conveyed in a borehole in the earth formation and producing an electromagnetic field in a region surrounding the antenna;
   using a receiver antenna for producing an output responsive to a first current generated by the electromagnetic field in the formation and to a second current generated by the electromagnetic field in the borehole; and
   using a plurality of electrodes on the mandrel to provide voltages indicative of a distribution of the second current.

14. The method of claim 13 further comprising positioning the transmitter antenna between an upper section of the mandrel and a lower section of the mandrel.

15. The method of claim 14 further comprising positioning a first set of the plurality of electrodes on the upper section and a second set of the plurality of electrodes on the lower section.

16. The method of claim 15 further comprising positioning a third set of electrodes on the upper section separated from the first set of electrodes, and a fourth set of electrodes on the lower section separated from the second set of electrodes.

17. The method of claim 16 further comprising using an output of the third and fourth sets of electrodes responsive to the first current for producing an image of the earth formation.

18. The method of claim 13 further comprising orienting the transmitter antenna at a non-zero angle to a longitudinal axis of the borehole.

19. The method of claim 13 further comprising measuring a standoff of the mandrel from a wall of the borehole.

20. The method of claim 19 further comprising using the standoff measurement, the voltages of the plurality of electrodes and the output of the receiver antenna for estimating a resistivity parameter of the earth formation.

21. The method of claim 19 wherein the processor estimates the resistivity parameter by using a model based at least in part on the voltages of the plurality of electrodes.

22. A non-transitory computer-readable medium product having stored thereon instructions that when read by at least one processor cause the at least one processor to perform a method, the method comprising:
   estimating a resistivity parameter of an earth formation using measurements made by a receiver antenna on a mandrel of a tool conveyed in a borehole responsive to a first current generated in an earth formation by an electromagnetic field by a transmitter antenna on the mandrel, and measurements made by a plurality of electrodes on the mandrel indicative of a distribution of a second current produced by the electromagnetic field in the borehole.

23. The machine readable medium of claim 22 further comprising at least one of: (i) a ROM, (ii) an EPROM, (iii) an EAROM, (iv) a flash memory, and (v) an optical disk.

* * * * *